March 19, 1963  A. R. HAMILTON  3,081,821
CYLINDER MOLD
Filed April 28, 1960
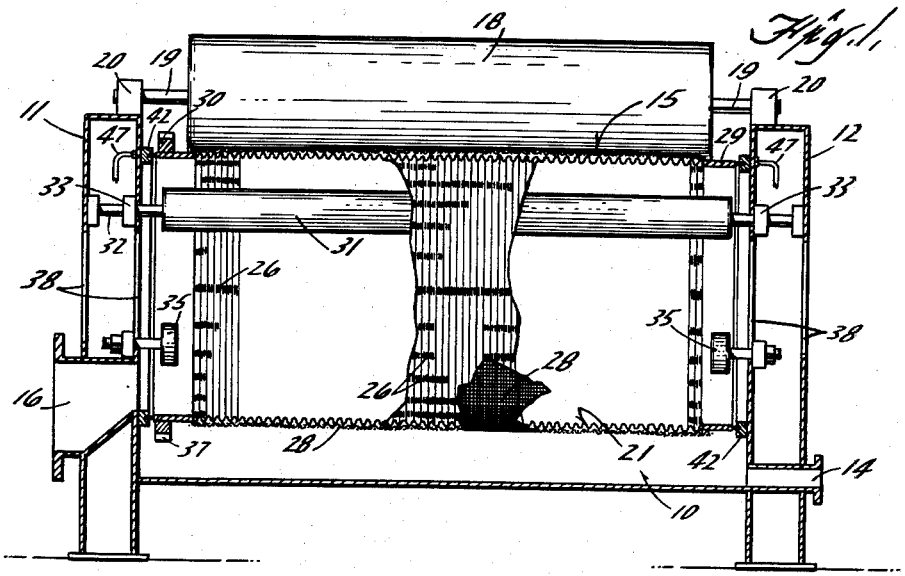
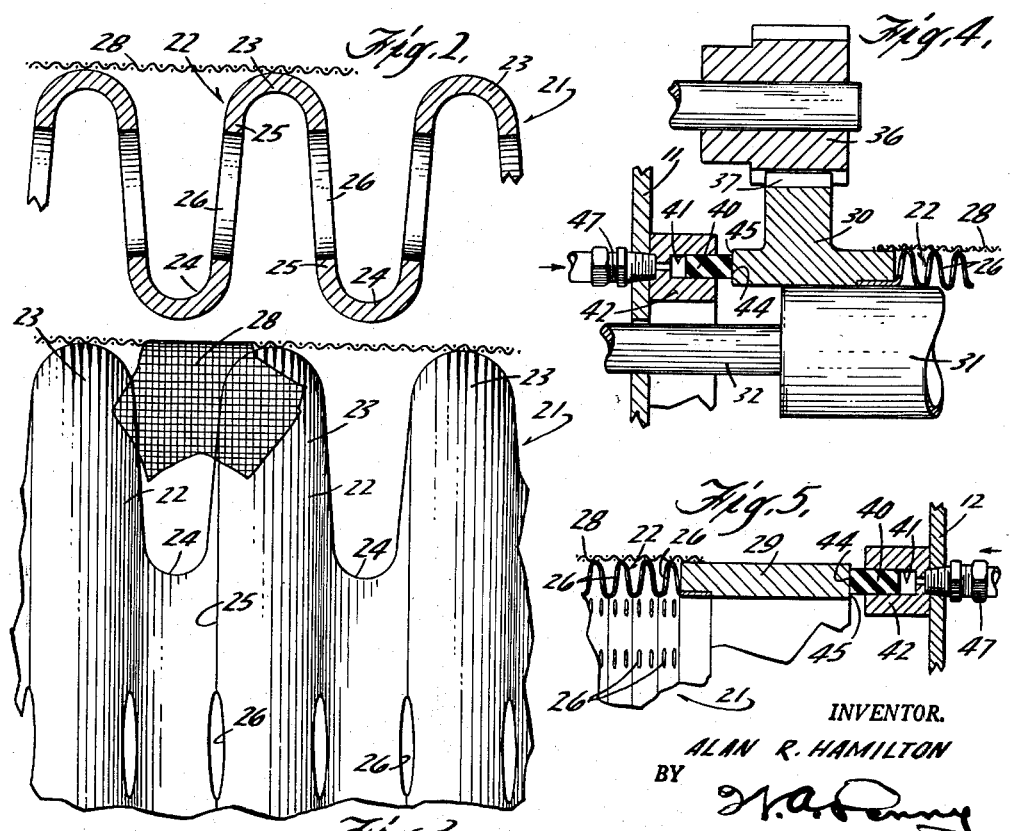
INVENTOR.
ALAN R. HAMILTON
BY
ATTORNEY

United States Patent Office 3,081,821
Patented Mar. 19, 1963

3,081,821
CYLINDER MOLD
Alan R. Hamilton, Brantford, Ontario, Canada, assignor to Koehring-Waterous Ltd., Brantford, Ontario, Canada, a Canadian corporation
Filed Apr. 28, 1960, Ser. No. 25,475
4 Claims. (Cl. 162—357)

The present invention relates to rotary drum filters and more particularly to filters of the type in which a foraminous filter drum rotates in a vat into which is supplied a slurry from which a solid material is to be removed with the filtrate passing through the drum and the solid being retained on the drum surface.

Rotary filters of this character find particular but by no means exclusive use in the paper industry wherein such apparatus is conventionally known as a decker or save-all and can be employed as the cylinder mold in a cylinder type paper making machine, as a pulp thickener, or a pulp washer. In the operation of a rotary filter such as a cylinder mold, for example, the drum is substantially immersed in a pulp slurry. The filter cake emerging from the vat on the cylinder surface is lifted off of the cylinder mold and directed onto a belt, or felt, or otherwise collected for subsequent processing.

It is the principal object of the present invention to improve the construction of rotary filters of the foregoing type. More specifically, it is an object to provide an improved cylinder construction for a decker or rotary drum filter. An important object of the present invention is to provide a cylinder mold capable of operating at higher speeds than has heretofore been possible without agitating or beating the liquid within the cylinder or splashing the liquid out of the apparatus.

Cylinder molds have conventionally been constructed from a series of metal spiders mounted on a shaft for rotation therewith and carrying a series of rods laid longitudinally in slots cut in the periphery of the spiders. The rods are helically wound with wire over which is placed one or more wire cloths. The rods, wire and wire cloth may be made of copper, brass, bronze, stainless steel, or Monel metal.

Another object of the present invention is to reduce the multiplicity of small interstices present in the interior of the conventional cylinder mold construction and thereby prevent the collection of fine fibers and resultant loss of filtering efficiency.

A further object of the present invention is to increase the effective drainage area of a cylinder mold of the foregoing character and thereby increase the flow of liquid through a cylinder mold without affecting the filtering efficiency thereof.

Still another object of the present invention is to provide a cylinder mold of the foregoing type which requires a minimum of cleaning and which is readily accessible for cleaning when needed.

Other objects and advantages of the present invention will become apparent as the following description proceeds taken in connection with the accompanying drawing wherein:

FIGURE 1 is an elevation view, partly in section and with parts broken away, of a decker having a cylinder mold embodying the present invention.

FIG. 2 is an enlarged section view of a portion of the cylinder mold shown in FIG. 1.

FIG. 3 is an enlarged elevation view of a portion of the cylinder mold shown in FIG. 1.

FIG. 4 is a fragmentary section view of an illustrative cylinder mold drive mechanism and seal.

FIG. 5 is a further fragmentary section view illustrating a liquid seal for use with the cylinder mold.

While a certain illustrative embodiment of the invention has been shown in the drawing and will be described below in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

The general arrangement of an illustrative decker is shown in FIG. 1. In the construction shown, the decker comprises a vat 10, which is generally an enlarged round bottom cylindrical tank formed of heavy box section ends 11, 12, connected by curved plates to form a cylindrical vat. An inlet connection (not shown) is provided along one edge of the vat 10 through which a slurry, such as a paper pulp slurry, is supplied. A drain 14 is provided at the bottom of the vat so that the tank may be readily emptied.

Mounted within the vat is a cylinder mold, indicated generally at 15. The mold is formed with a perforated surface as will be described shortly. The slurry fills the vat so that the cylinder mold 15 is substantially immersed. The liquid passes through the perforations in the surface and is discharged through an outlet 16. The pulp remains as a mat or filter cake on the surface of the cylinder mold from which it is removed by means of pick-up roll 18. The mat of pulp fibers or other solid is scraped from the pick-up roll 18 by a doctor blade (not shown) or other suitable means are employed for picking up the filter cake. The pick-up roll 18 is conventionally constructed with a steel shell having a soft rubber or neoprene cover and is supported on a shaft 19 journaled for rotation by antifriction bearings 20 mounted on the ends 11 and 12 of the vat.

In accordance with the present invention, the cylinder mold 15 includes a cylinder of a new and improved construction to afford higher speeds of rotation without agitating the liquid, to provide a greater flow of liquid therethrough, and at the same time produce an efficient thickening action as recited in the foregoing objects. To this end the cylinder mold is constructed as shown in FIGS. 2 and 3 in the form of a large metal or plastic drum or cylinder 21 (FIG. 1) the walls of which are shaped into a multiplicity of shallow substantially straight walled corrugations 22. As is apparent from FIGS. 1, 4 and 5, the corrugations form a plurality of peaks 23 alternating with corresponding valleys or grooves 24, with intermediate substantially radial walls 25. In each of the radial walls 25 of the corrugations 22 there is provided a plurality of relatively large apertures 26 circumferentially spaced around the cylinder 21.

For collecting and retaining pulp fibers and the like, there is supported on the peaks 23 of the corrugations a layer of fine wire mesh cloth 28. The peaks 23 of the corrugations 22 are spaced closely enough to provide adequate support for the wire cloth 28. It will be appreciated also that a substantial area is provided in the troughs 24 so that filtrate liquid can pass readily through the wire mesh cloth 28 into the trough 24 and through the holes 26 in the corrugation walls 25 into the interior of the cylinder. From the interior of the cylinder the liquid flows outwardly through the discharge opening 16 in the end of the vat. To illustrate the size of a typical corrugated cylinder mold, the cylinder is formed with a nominal diameter of 4 ft. and a length of 8 ft. Corrugations are formed in the cylinder surface to a depth of about one-half inch and on three-eighth inch centers with substantially radial walls. Holes about one-fourth inch in diameter are formed in the walls on three-fourth inch centers. As a result, in a 4 ft. diameter cylinder, approximately 200 holes are formed in the circumference of each corrugation wall.

For mounting the corrugated cylinder mold 15 in the vat, the cylinder 21 is mounted at each end on an end ring 29, 30. Supporting the cylinder mold within the vat is a pair of support rollers 31, one of which is shown in FIG. 1, extending through the cylinder adjacent its upper portion and engaging the roots of cylinder corrugations 22 and end rings 29, 30. Each support roller 31 is mounted on a shaft 32 journaled in suitable anti-friction bearings 33 mounted on the vat end walls 11 and 12. For guiding and stabilizing the cylinder, idler rollers 35 are provided journaled on the vat end walls and engaging the drum rings 29 and 30 adjacent the lower portion of the cylinder. The cylinder mold is driven from a suitable input gear 36 which engages with appropriate gear teeth 37 formed on one of the end rings 30. It will be appreciated that the open structure of the cylinder mold and its mounting facilitates cleaning the interior of the cylinder. To this end, suitable openings 38 are provided in the walls of the vat end boxes 11 and 12.

In accordance with another aspect of the present invention, improved sealing means are provided to prevent the slurry being filtered from leaking into the cylinder mold past the ends thereof, and, conversely, to prevent the filtrate from diluting the slurry. One illustrative sealing means embodying the invention comprises suitable end seals positioned between the vat end walls 11 and 12 and the end rings 29 and 30, which end seals are formed by an endless sealing ring 40, of neoprene rubber or the like, supported in an annular groove 41 in a ring member 42 mounted on the end frames 11 and 12. The sealing ring 40 is provided with a sealing surface 44 which engages a corresponding sealing surface 45 defined on each of the cylinder mold end rings 29 and 30. To provide a constant sealing pressure between the sealing ring 40 and the end rings 29 and 30, a pressure is applied within the annular groove 41. This is preferably accomplished by the use of water supplied under pressure to the groove back of the sealing ring 30 through suitable conduit and fittings 47.

While the cylinder mold embodying the invention has been described in conjunction with a couch roll for use as a decker, it will be appreciated that a cylinder mold of this character will find wide application to many other filtering applications. As examples of such uses, the cylinder mold could be used as a paper machine save-all to recover usable fibers from white water; with or without a feed of long fibered sweetener stock to form a filtering mat on the wire; or it could be used with a felt, press rolls, guide rolls and accompanying equipment as a pulp wet machine. Also, by the provision of suitable longitudinal partitions on the drum and in conjunction with a suction box, the cylinder mold could be used as a vacuum filter, a suction roll for a paper machine or a vacuum sheet forming machine. Many other uses will, of course, occur to those skilled in the art upon reading the foregoing specification and it is applicant's intention to include such uses within the scope of his invention.

I claim as my invention:

1. A cylinder mold for use in a rotary drum filter comprising a cylindrical drum member the surface of which is formed with a multiplicity of axially alined circumferential corrugations each having a pair of spaced substantially radial walls, each of said walls having a substantial plurality of perforations therethrough, said perforations extending generally axially of said drum, said corrugations defining ridges, and a wire cloth supported on said corrugation ridges and surrounding said drum to enclose said perforations.

2. A cylinder mold for use in a rotary drum filter comprising a cylindrical drum member the surface of which is formed with a multiplicity of axially alined corrugations each having a pair of spaced substantially radial walls, each of said walls having a substantial plurality of perforations therethrough, said perforations extending generally axially of said drum, and a foraminous material supported on said ridges and surrounding said drum to enclose said perforations.

3. A cylinder mold comprising a cylindrical drum member the surface of which is formed with a multiplicity of axially alined corrugations each having a pair of spaced substantially radial walls, each of said walls having a plurality of perforations therethrough, said perforations extending generally axially of said drum.

4. A cylinder mold for use in a rotary drum filter comprising a cylindrical drum member, annular end ring secured to each end of said drum member for supporting the same, the surface of said drum member being formed with a multiplicity of axially alined circumferential corrugations having substantially radial walls, said walls having a substantial plurality of perforations therethrough, said perforations extending generally axially of said drum, said corrugations defining ridges, a wire cloth supported on said corrugations ridges and surrounding said drum to enclose said perforations, said end rings having an annular sealing surface defined thereon, a continuous solid annular sealing member, a ring defining an annular channel supporting said sealing member, and means for applying a fluid pressure within said channel and directly against said sealing member for urging said sealing member into continuous sealing engagement with the adjacent ring sealing surface whereby liquid being filtered must pass through said cloth and drum member perforations.

References Cited in the file of this patent

UNITED STATES PATENTS

| | | |
|---|---|---|
| 1,782,281 | Yonekura | Nov. 18, 1930 |
| 1,889,606 | Lange | Nov. 29, 1932 |
| 2,329,553 | Newbould | Sept. 14, 1943 |
| 2,462,596 | Bent | Feb. 22, 1949 |
| 2,626,543 | Hornbostel | Jan. 27, 1953 |
| 2,732,268 | Duval | Jan. 24, 1956 |
| 2,738,996 | Andersson | Mar. 20, 1956 |
| 2,888,074 | Hornbostel | May 26, 1959 |

FOREIGN PATENTS

| | | |
|---|---|---|
| 126,849 | Germany | Jan. 4, 1902 |
| 543,260 | Germany | Feb. 3, 1932 |